United States Patent [19]

Kawase

[11] Patent Number: 4,871,987

[45] Date of Patent: Oct. 3, 1989

[54] FSK OR AM MODULATOR WITH DIGITAL WAVEFORM SHAPING

[75] Inventor: Seiji Kawase, Yokohama, Japan

[73] Assignee: Kabushiki Kaisha Kenwood, Tokyo, Japan

[21] Appl. No.: 174,170

[22] Filed: Mar. 28, 1988

[30] Foreign Application Priority Data

Mar. 28, 1987 [JP] Japan ............................ 62-45042[U]
May 18, 1987 [JP] Japan ............................ 62-72930[U]

[51] Int. Cl.$^4$ ...................... H04L 27/04; H04L 27/12
[52] U.S. Cl. .................................... 332/100; 332/149; 375/41; 375/45; 375/62; 375/67
[58] Field of Search .............. 332/9 R, 10, 16 R, 9 T, 332/16 T, 31 R; 375/45, 51, 52, 57, 58, 60, 62, 65, 67, 41

[56] References Cited

U.S. PATENT DOCUMENTS 4,003,002 1/1977 Snijders et al. ...................... 332/10

Primary Examiner—Siegfried H. Grimm
Attorney, Agent, or Firm—Gerald J. Ferguson, Jr.

[57] ABSTRACT

A binary signal modulator includes a sampling circuit for sampling a binary signal at a predetermined sampling frequency, a modulating circuit responsive to the sampled binary signal for generating a modulating signal, the rising and decaying timings of which are respectively determined by the start and end times of the binary signal and the rising and decaying characteristics of which are respectively defined as predetermined functions, and a circuit responsive to the modulating signal for generating a modulated signal.

8 Claims, 3 Drawing Sheets

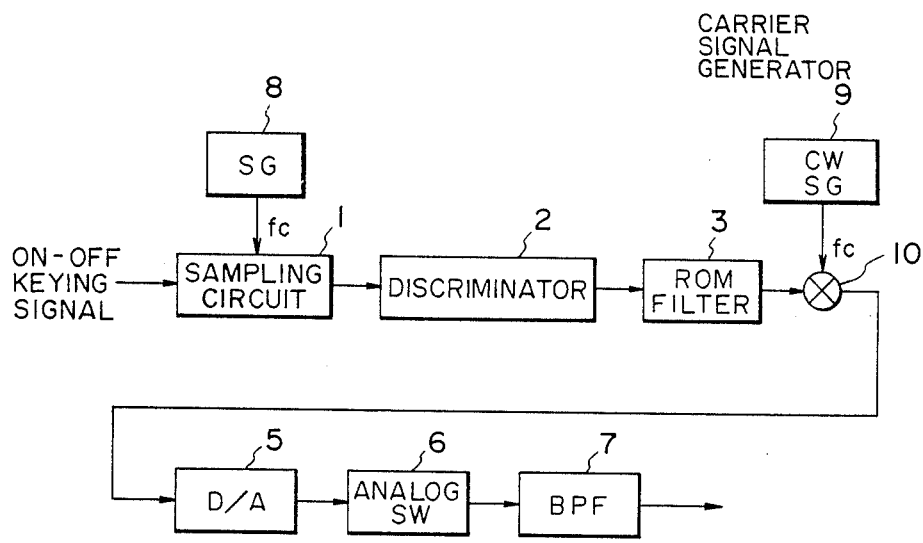
FIG. 3
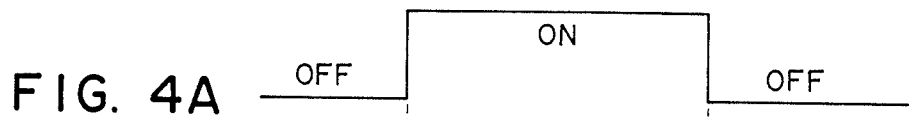
FIG. 4A
FIG. 4B
FIG. 4C
FIG. 4D

FSK OR AM MODULATOR WITH DIGITAL WAVEFORM SHAPING

BACKGROUND OF THE INVENTION

1. Field of the Invention

The present invention relates to a modulating circuit suitable for limiting an occupied bandwidth as desired, and more particularly to a modulating circuit having means for generating a modulating signal in a digital process.

2. Related art

In a conventional frequency shift keying (FSK) circuit for example, a mark-space signal is supplied to a low-pass filter having a predetermined bandwidth to attenuate unnecessary frequencies. The output of the low-pass filter is supplied to a voltage-controlled oscillator as its control voltage. The output of the voltage-controlled oscillator is then modulated to obtain an FSK wave.

In the field of amateur radio communications, an audio frequency signal is keyed by a mark-space signal to convert it into an audio frequency shift keying (AFSK) signal. The AFSK signal is supplied via a low-pass filter to a balanced modulator to modulate a frequency $f_c$ signal by the AFSK signal and obtain via a single sideband (SSB) filter an FSK wave.

The former technique however poses a problem in that the oscillation frequency of the voltage-controlled oscillator cannot be set at precise points because it is difficult to manufacture analog low-pass filters having precise and same frequency characteristics, due to variations in filter elements.

The latter technique also poses a problem in that it requires two oscillators for generating an AFSK signal while taking into consideration noises generated in switching the oscillators, a balanced modulator for modulating a frequency $f_c$ signal by the AFSK signal, an SSB filter and the like, resulting in an increase in number of elements and a deteriorated FSK wave.

Further, in a conventional transmitter using an on-off keying modulation, a keying signal for on-off keying a continuous wave is used in cooperative association with a gain adjusting voltage for the transmission power. The gain adjustment voltage is given a predetermined time constant in an analog way to suppress key clicks during keying and prevent the bandwidth from being broadened at the rising and decaying of a transmission signal.

With this technique however, there arises a problem in that it is difficult to realize a time constant circuit having a time constant which is correct and sufficient for limiting the bandwidth. In addition, it is not easy to make the time constant completely equal both at the rising and decaying times so that the bandwidth occupied by a modulated wave becomes broad in dependence on a shorter time constant.

SUMMARY OF THE INVENTION

The above problems are solved by a binary signal modulator according to the present invention, which comprises means for sampling a binary signal at a predetermined sampling frequency; means in response to the sampled binary signal for generating a modulating signal, the rising and decaying timings of which are respectively determined by the start and end times of the binary signal and the rising and decaying characteristics of which are respectively defined as predetermined functions; and means in response to the modulating signal for generating a modulated signal.

BRIEF DESCRIPTION OF THE DRAWINGS

FIG. 3 is a block diagram of a second embodiment of an on-off keying modulating circuit according to the present invention.

FIGS. 4A to 4D are signal waveforms obtained by the on-off keying modulating circuit shown in FIG. 3.

EMBODIMENT OF THIS INVENTION

Figure 1:
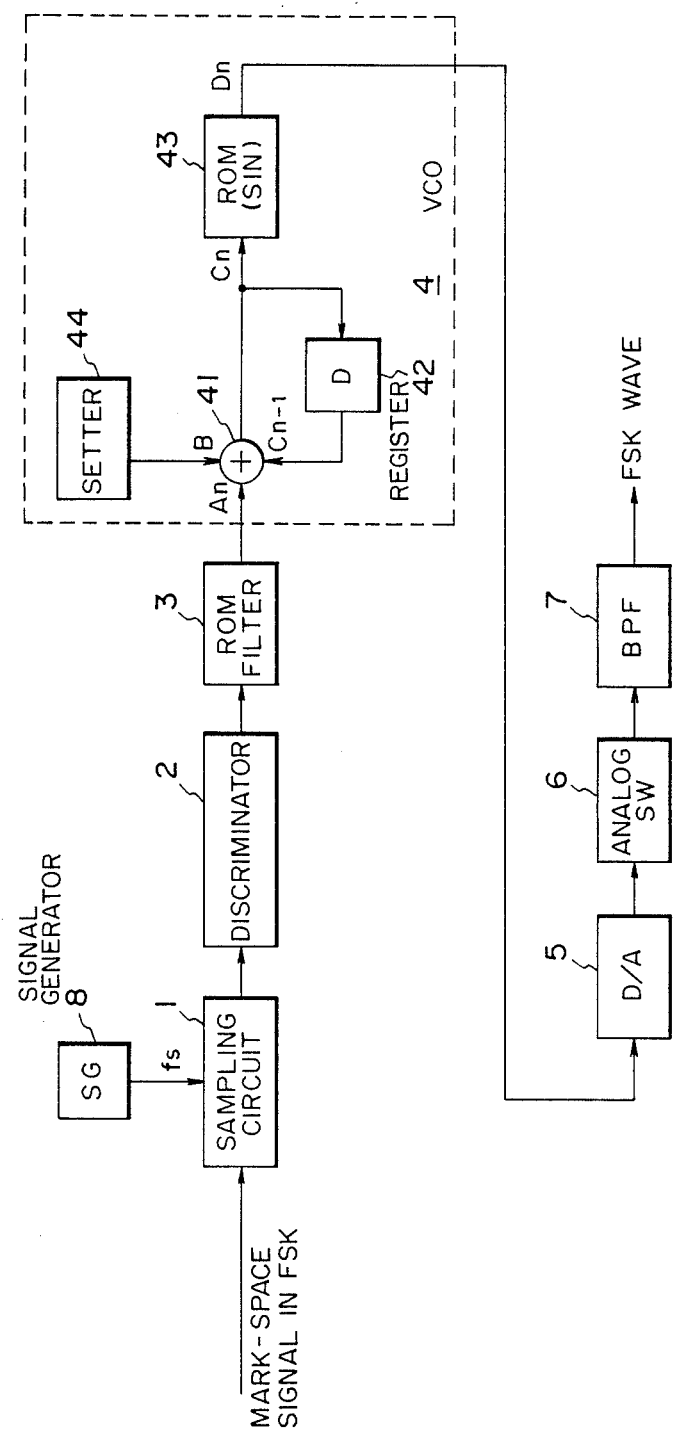
FIG. 1 is a block diagram of a first embodiment of an FSK modulating circuit according to the present invention.

A mark ("1")—space ("0") signal for FSK is sampled and made discrete by a sampling circuit 1 at a sampling frequency $f_S$ supplied from a signal generator 8. The FSK mark-space signal made discrete by the sampling circuit 1 is discriminated by a discriminator 2 where the signal is high or low level. A ROM filter 3 storing digital values having a Gaussian characteristic relative to the step response to the rising and decaying information of the FSK mark-space signal, preforms a wave-shaping for the FSK mark-space rectangular signal. Namely, an output from the discriminator 2 is supplied to the ROM filter 3 which then reads output data having a Gaussian response at the rising and decaying portions of the FSK mark signal and having a constant output level at the intermediate portion between the rising and decaying portions. The output data read out of the ROM filter 3 is applied to a voltage-controlled oscillator (VCO) 4 which processes signals in a digital way. A digital output signal of VCO 4 is converted into an analog signal by a digital/analog (D/A) converter 5. The VCO 4 is constructed of an adder 41, a register 42 for delaying an output of the adder 41, a ROM 43 which receives an output of the adder 41 as its phase information and storing sine-function data for generating sine wave signals based on the received phase information, and a setter 44 for setting free-running frequency. The adder 41 is arranged to add together the outputs from the ROM filter 3, the register 42 and the setter 44. Discrete sine wave data are outputted from VCO 4 in accordance with output data from the ROM filter 3. VCO 4 constitutes a phase modulator which generates digital sine wave signals phase-modulated based on an output of the ROM filter 3.

An analog signal outputted from the D/A converter 5 is switched by an analog switch 6 to make the analog signal have a predetermined pulse width and accordingly make a predetermined frequency have a maximum power, thereafter deriving an FSK wave via an analog band-pass filter 7.

Figure 2:
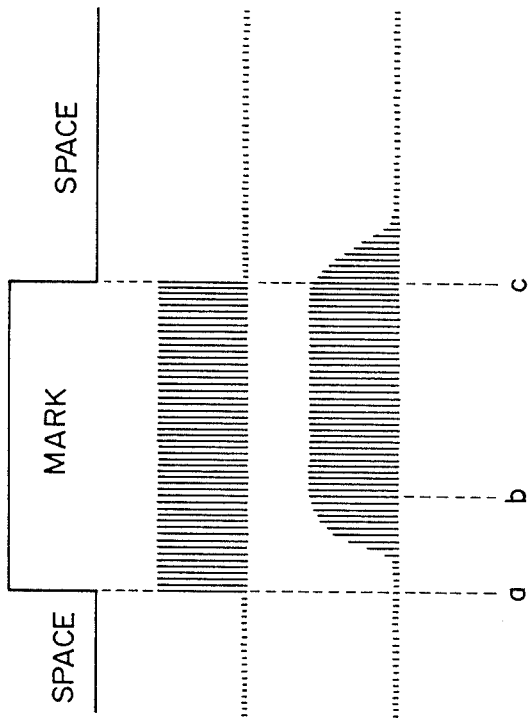
FIGS. 2A to 2C show signal waveforms obtained by the FSK modulating circuit shown in FIG. 1.

In operation of the above embodiment, an FSK mark-space signal as shown in FIG. 2A is sampled by the sampling circuit 1 at a sampling frequency $f_S$. The sampled signal outputted from the sampling circuit 1 is as shown in FIG. 2B which in turn is supplied to the discriminator 2 whereat the output of the sampling circuit 1 is discriminated if it is high or low level.

An output of the discriminator 2 is supplied to the ROM filter 3 to detect a rising time of an FSK mark signal based on the start of an output from the discriminator 2 and a decaying time thereof based on the end of the output. Each time a discrimination result is outputted, i.e., at each sampling time, the ROM filter 3 delivers step response output data including data from "0" at the rising time to near "1" during the period defined by a-b section shown in FIG. 2C, data of "1" during the period defined by b-c section shown in FIG. 2C, and data from "1" at the decaying time "0" during the period after c. The output data from the ROM filter 3 are illustratively shown in FIG. 2C. Output data "0" to "1" are read during the a-b period, output data "1" are read during the b-c section, and output data "1" to "0" are read during the section after c using addresses of opposite order to those used during the section a-b.

In VCO 4, output data $A_n$ of the ROM filter 3 waveform-shaped and having instantaneous levels, constant data B set by the setter 44, and output data $C_{n-1}$ of the one-sample time delay (simply constructed of a register) 42, are added together to obtain a signal corresponding to the phase of a sine wave signal:

$$C_n = A_n + B + C_{n-1} \quad (1)$$

the corresponding difference equation being given by:

$$C_n = \sum_{j=1}^{n} A_j + nB + C_0 \quad (2)$$

The equation (2) indicates that signal $C_n$ is the sum of an accumulated value of input signal $A_n$ at time n, a constant B and an initial value $C_0$ at time 0 of the ROM filter output.

Signal $C_n$ is inputted to the one sample delay (register) 42 to determine an output at the next time (n+1), and also inputted to ROM 43 previously written with sine-function data. ROM 43 outputs a sine-function value $D_n$ for a phase corresponding to the phase information data $C_n$:

$$\begin{aligned} D_n &= \sin(C_n) \quad (3) \\ &= \sin\left(\sum_{j=1}^{n} A_j + nB + C_0\right) \end{aligned}$$

The instantaneous frequency $f_n$ of a generated sine wave signal $D_n$ given by the equation (3) is obtained from a discrete time-domain differential of the phase term $C_n$:

$$f_n = \frac{\Delta C_n}{n} = \frac{C_n - C_{n-1}}{n - (n-1)} = \sum_{j=1}^{n} A_j + \quad (4)$$
$$nB - \sum_{j=1}^{n-1} A_j - (n-1)B = A_n + B$$

It can be seen from the equation (4) that the instantaneous frequency $f_n$ of the output $D_n$ of the function ROM 43 is the sum of the signal data $A_n$ inputted to VCO 4 and the set constant data B. This means that a frequency modulated signal $D_n$ of the input signal $A_n$ is outputted from ROM 43.

VCO 4 in cooperation with the D/A converter 5 derives an output having a frequency corresponding to the FSK space during "0" input data, a frequency corresponding to the FSK mark during "1" input data, or an intermediate frequency between the space and mark frequencies during input data between "0" to "1".

A signal outputted from the D/A converter 5 and having such a frequency is switched by the analog switch 6 to cut opposite ends thereof and accordingly make a desired frequency have a maximum power.

Thereafter, unnecessary frequency components are removed by the band-pass filter 7 to obtain an FSK wave.

In the above embodiment, an FSK modulator has been described which employs VCO 4 to obtain an FSK wave. Instead of VCO 4, a phase modulator may be employed to obtain a PSK wave with a limited bandwidth.

In the structure described as above, the main parts including input means, wave-shaping means and modulating means process signals in a digital way so that they can be realized using a microprocessor or a dedicated integrated circuit, thereby enabling a compact and high performance circuit.

A binary input signal is digitally processed by waveshaping means which has a characteristic equivalent to a low-pass filter, such as a Gaussian characteristic. Such characteristic can be precisely defined using computed data so that nearly an ideal characteristic can be obtained as compared with an analog version of a waveshaping means.

Since a wave-shaping means has an ideal characteristic equivalent to a low-pass filter, the bandwidth of an outputted FSK or PSK wave can be limited to an objective one.

FIG. 3 is a block diagram showing the structure of a second embodiment of this invention.

An on-off keying signal, i.e., a binary signal is sampled by a sampling circuit 1 at a sampling frequency $f_S$ supplied from a signal generator 8. The on-off keying signal sampled by the sampling circuit 1 is discriminated by a discriminator 2 whether the signal is high or low level. A ROM filter 3 constitutes wave-shaping means for wave-shaping an on-off keying rectangular signal, the ROM filter 3 storing digital values having a Gaussian characteristic relative to the step response to the rising and decaying information of the on-off keying signal. Namely, an output from the discriminator 2 is supplied to the ROM filter 3 which then reads, in synchronism with the sampling period of the sampling circuit 1, output data (FIG. 4C) having a Gaussian response to the rising and decaying portions of the FSK mark signal and having a constant output level at the intermediate portion therebetween. The output data read out of the ROM filter 3 is applied to a multiplier 10 for amplitude-modulating it through multiplication by a carrier having a frequency of $f_c = f_S/4$ and taking four values 0, 1, 0 and $-1$ during the sampling period $1/f_S$. The carrier is generated by a signal generator 9.

A multiplied output from the multiplier 10 is supplied to a D/A converter 5 and converted into an analog signal which is switched by an analog switch 6 to make the analog signal have a predetermined pulse width and accordingly make a desired frequency have a maximum power. A modulated wave is derived out of an analog band-pass filter 7.

In operation of the above embodiment, an on-off keying signal as shown in FIG. 4A is sampled by the sampling circuit 1 at a sampling frequency $f_S$. The sampled signal outputted from the sampling circuit 1 is as shown in FIG. 4B which in turn is supplied to the discriminator 2 whereat the output of the sampling circuit 1 is discriminated if it is high or low level.

The ROM filter 3 in this embodiment is similar to that described with FIG. 1.

Data outputted from the ROM filter 3 are multiplied with the carrier having values 0, 1, 0, $-1$, 0, 1, . . .

outputted from the signal generator 9, in order to generate an amplitude-modulated (AM) signal. The output from the multiplier 10 is illustratively shown in FIG. 4D, which is converted into an analog signal by a D/A converter 5. The output of the D/A converter 5 is switched to cut opposite ends thereof and make a desired frequency have a maximum power. Thereafter, unnecessary frequencies are removed and an AM signal is obtained from the band-pass filter 7.

Multiplication by the multiplier 10 is digitally performed and the resultant digital value is converted into an analog value. Thus, the multiplier 10 and the D/A converter function in combination as an AM modulator.

An on-off keyed continuous wave is outputted from the band-pass filter 7.

The sampling circuit 1, discriminator 2, ROM filter 3 and multiplier 10 may be constructed using a microcomputer. In this case, other modulations such as SSB, FM and the like may be used thus enabling a modulator of various modulating modes.

In the structure constructed as above, input means, wave-shaping means and multiplier means can process signals in a digital way so that they can be realized using a microprocessor or a dedicated integrated circuit, thereby enabling a compact and high performance circuit.

An input on-off keying signal is digitally processed by wave-shaping means which has a characteristic equivalent to a low-pass filter, such as a Gaussian characteristic. Such characteristic can be precisely defined using computed data so that nearly an ideal characteristic can be obtained as compared with an analog version of a wave-shaping means.

Since a wave-shaping means has an ideal response characteristic equivalent to a low-pass filter, the bandwidth of an outputted on-off keying modulated continuous wave becomes approximately an ideal one.

What is claimed is:

1. An FSK modulator for a mark-space signal comprising:
    first sequence generating means responsive to the beginning and end time points of each of the marks in the mark-space signal for generating a first sequence of digital values at every predetermined period, the magnitudes of the digital values in the rising and decaying intervals of the predetermined period being respectively defined as specific functions stored in said generating means and the magnitude of the digital values in the intermediate interval being constant;
    second sequence producing means for producing out of the first sequence of digital values a second sequence of digital values the magnitudes of which represent a sinusoidal wave, the instantaneous frequency of the sinusoidal wave corresponding to the magnitude of each of the digital values of the first sequence; and
    converting means for digital-analog converting the second sequence of digital values into an analog signal of said sinusoidal wave to form an FSK signal.

2. An FSK modulator according to claim 1 further comprising sampling means for sampling the mark-space signal at said predetermined period to provide said first sequence generating means with the sampled signals, wherein said first sequence generating means in response to the first beginning sample of the mark generates the digital values of a stored first specific function at the rising interval, after the rising interval generates constant digital values, and in response to the last end sample of the mark generates the digital values of a stored second specific function.

3. An FSK modulator according to claim 1, wherein said specific functions are Gaussian characteristic curves.

4. An FSK modulator according to claim 1, wherein said second sequence producing means includes a digital adder having first and second inputs, an output, digital sinusoidal wave generator, and delay means.

5. An AM modulator for a mark-space signal comprising:
    first sequence generating means responsive to the beginning and end time points of each of the marks in the mark-space signal for generating a first sequence of digital values at every predetermined period, the magnitudes of the digital values in the rising and decaying intervals of the predetermined period being respectively defined as specific functions stored in said generating means and the magnitudes of the digital values in the intermediate interval being constant;
    second sequence producing means for producing out of the first sequence of digital values a second sequence of digital values the magnitudes of which represent a sinusoidal wave, the amplitude envelope of the sinusoidal wave corresponding to the magnitude envelope of each of the digital values of the first sequence; and
    converting means for digital-analog converting the second sequence of digital values into an analog signal of said sinusoidal wave to form an AM signal.

6. An AM modulator according to claim 5 further comprising sampling means for sampling the mark-space signal at said predetermined period to provide said first sequence generating means with the sampled signals, wherein said first sequence generating means in response to the first beginning sample of the mark generates the digital values of a stored first specific function at the rising interval, after the rising interval generates constant digital values, and in response to the last end sample of the mark generates the digital values of a stored second specific function.

7. An AM modulator according to claim 5, wherein said specific functions are Gaussian characteristic curves.

8. An AM modulator according to claim 5, wherein said second sequence producing means includes a digital multiplier for multiplying the digital values of the second sequence and the digital values of a carrier signal.

* * * * *